(12) United States Patent
Burns et al.

(10) Patent No.: US 8,890,831 B2
(45) Date of Patent: Nov. 18, 2014

(54) FLEXIBLE TOUCH SCREEN DISPLAY

(71) Applicant: Plastic Logic Limited, Cambridge (GB)

(72) Inventors: Seamus Burns, Cambridge (GB); Sharjil Siddique, Cambridge (GB); Simon Jones, Cambridge (GB)

(73) Assignee: Plastic Logic Limited, Cambridgeshire (GB)

( * ) Notice: Subject to any disclaimer, the term of this patent is extended or adjusted under 35 U.S.C. 154(b) by 0 days.

(21) Appl. No.: 13/874,276

(22) Filed: Apr. 30, 2013

(65) Prior Publication Data

US 2013/0265280 A1    Oct. 10, 2013

Related U.S. Application Data

(63) Continuation of application No. 11/996,492, filed as application No. PCT/GB2006/050220 on Jul. 24, 2006, now Pat. No. 8,451,249.

(30) Foreign Application Priority Data

Jul. 25, 2005   (GB) .................................. 0515175.8
Nov. 14, 2005   (GB) .................................. 0523125.3

(51) Int. Cl.
  *G06F 3/044*   (2006.01)
  *G06F 3/045*   (2006.01)
  *G06F 3/041*   (2006.01)

(52) U.S. Cl.
  CPC .............. *G06F 3/0412* (2013.01); *G06F 3/045* (2013.01); *G06F 3/044* (2013.01)
  USPC ...................... 345/173; 178/18.03; 178/18.06; 345/107

(58) Field of Classification Search
  USPC ................................... 345/84, 107, 173–178; 178/18.01–20.04
  See application file for complete search history.

(56) References Cited

U.S. PATENT DOCUMENTS

| | | | |
|---|---|---|---|
| 5,623,280 A * | 4/1997 | Akins et al. ................... | 345/104 |
| 5,748,185 A | 5/1998 | Stephan et al. | |
| 5,907,375 A | 5/1999 | Nishikawa et al. | |
| 6,344,662 B1 | 2/2002 | Dimitrakopoulos et al. | |
| 2001/0022632 A1 | 9/2001 | Umemoto et al. | |

(Continued)

FOREIGN PATENT DOCUMENTS

| CA | 2355434 A1 | 2/2002 |
|---|---|---|
| JP | S58-56190 A | 4/1983 |

(Continued)

OTHER PUBLICATIONS

International Search Report from PCT/GB2006/050220 dated Dec. 22, 2006.

(Continued)

*Primary Examiner* — Dmitriy Bolotin
(74) *Attorney, Agent, or Firm* — Knobbe, Martens, Olson & Bear, LLP (57) ABSTRACT

A touch sensitive active matrix display device is provided. The device includes a display fabricated on a first flexible substrate, said display having a viewing surface. The device further includes a touch sensitive sensor including a second flexible substrate, under said display. The touch sensor is operated by touching said viewing surface of said display, and said combined display and touch sensitive sensor is flexible.

17 Claims, 4 Drawing Sheets

(56) References Cited

U.S. PATENT DOCUMENTS

| | | | |
|---|---|---|---|
| 2001/0040554 A1 | 11/2001 | Nakagawa | |
| 2002/0018043 A1* | 2/2002 | Nakanishi | 345/107 |
| 2002/0033792 A1 | 3/2002 | Inoue | |
| 2002/0149572 A1 | 10/2002 | Schulz et al. | |
| 2003/0026971 A1* | 2/2003 | Inkster et al. | 428/304.4 |
| 2004/0121599 A1 | 6/2004 | Aminpur et al. | |
| 2004/0212599 A1 | 10/2004 | Cok et al. | |
| 2005/0024344 A1 | 2/2005 | Trachte | |
| 2005/0035374 A1* | 2/2005 | Malajovich | 257/222 |
| 2005/0118922 A1* | 6/2005 | Endo | 445/24 |
| 2005/0162402 A1 | 7/2005 | Watanachote | |
| 2005/0174335 A1 | 8/2005 | Kent et al. | |
| 2006/0097991 A1 | 5/2006 | Hotelling et al. | |
| 2006/0108579 A1* | 5/2006 | Kim et al. | 257/40 |
| 2006/0214154 A1* | 9/2006 | Yang et al. | 257/40 |
| 2006/0250558 A1* | 11/2006 | Burns et al. | 349/139 |
| 2006/0286737 A1* | 12/2006 | Levy et al. | 438/199 |
| 2007/0085837 A1* | 4/2007 | Ricks et al. | 345/173 |
| 2007/0085838 A1* | 4/2007 | Ricks et al. | 345/173 |
| 2008/0055274 A1* | 3/2008 | Van Berkel et al. | 345/174 |
| 2008/0158171 A1* | 7/2008 | Wong et al. | 345/173 |

FOREIGN PATENT DOCUMENTS

| | | |
|---|---|---|
| JP | 2002-259053 A | 9/2002 |
| JP | 2004-046115 A | 2/2004 |
| JP | 2004-179707 A | 10/2004 |
| JP | 2005-183616 A | 7/2005 |
| WO | 97/18547 A1 | 5/1997 |
| WO | WO 99/10939 | 3/1999 |
| WO | 99/19855 A1 | 4/1999 |
| WO | WO 2004/066136 | 8/2004 |
| WO | WO 2004/070466 | 8/2004 |
| WO | WO 2005/010735 | 2/2005 |
| WO | WO 2005/010822 | 2/2005 |
| WO | WO 2005/078566 | 8/2005 |
| WO | 2006/020304 A2 | 2/2006 |
| WO | WO 2006/056808 | 6/2006 |
| WO | WO 2006/059162 | 6/2006 |
| WO | WO 2006/061658 | 6/2006 |

OTHER PUBLICATIONS

JA Rogers et al., Appl. Phys. Lett. 75, 1010 (1999).
S Brittain et al., Physics World, May 1998, p. 31.
Z Bao et al., Chem Mat. 9, 12999 (1997).
European Search Report issued on EP 07733704.6 dated Nov. 12, 2010.
European Search Report issued on EP 07733704.6 dated Apr. 6, 2009.
Exam Report issued in GB on GB0619172.0 dated Apr. 21, 2011.
International Search Report issued on PCT/GB2007/050283 dated Feb. 15, 2008.
Exam Report issued in GB on GB 0619172.2 dated Sep. 23, 2010.
Rogers, et al., "Printed Plastic Electronics and Paperlike Displays", Journal of Polymer Science: Part A: Polymer Chemistry, vol. 40, 2002, pp. 3327-3334, XP008042599.
Decision to Refuse a European Patent Application on 06 765 369.1-2224 dated Jul. 24, 2012.
Translated Questioning dated Apr. 16, 2013 for Japanese Patent Application No. 2008-523463.

* cited by examiner

FLEXIBLE TOUCH SCREEN DISPLAY

CROSS-REFERENCE TO RELATED APPLICATIONS

This application is a continuation of U.S. patent application Ser. No. 11/996,492, filed Aug. 16, 2010, entitled FLEXIBLE TOUCH SCREEN DISPLAY, which is the U.S. National Phase under 35 U.S.C. §371 of International Application No. PCT/GB2006/050220, filed Jul. 24, 2006, designating the United States and published in English on Feb. 1, 2007 as WO 2007/012899, which claims priority to United Kingdom Application No. 0515175.8, filed Jul. 25, 2005, and United Kingdom Application No. 0523125.3, filed Nov. 14, 2005.

FIELD OF THE INVENTION

This invention generally relates to integration of a flexible touch screen component, for example, using a resistive touch screen technology, with a flexible display to make a flexible combination device.

DESCRIPTION OF RELATED ART

There are several technologies known in the prior art for providing a sensor for a touch pad or touch screen. Such known technologies include capacitive technology, surface acoustic wave technology, pressure sensitive technology such as Quantum Tunnelling Composite (QTC) materials and resistive technology. We have previously described techniques for fabrication of flexible displays (see, for example, WO 2004/070466, WO 2006/059162, WO 2006/056808, WO 2006/061658, all hereby incorporated by reference). Here we are particularly concerned with integration of a resistive touch screen component with a display media and a backplane incorporating a flexible substrate to form a novel flexible resistive touch screen display structure.

Figure 1:
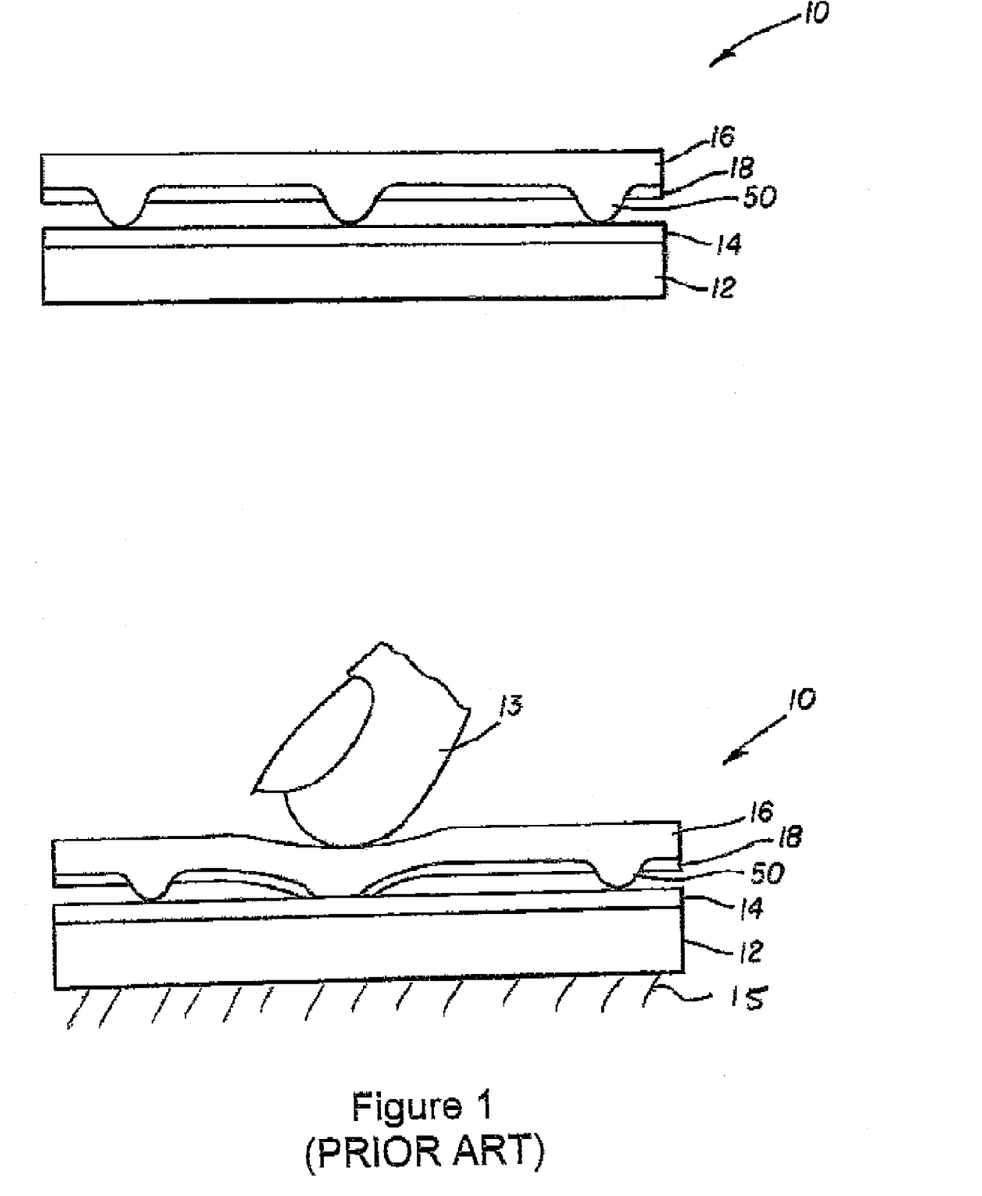
FIG. 1 illustrates a touch screen structure configuration known in the art.

FIG. 1, which is taken from US 2004/121599 shows one example of a known resistive touch screen display (10). This has a substrate (12), first conductive layer (14), cover sheet (16), second conductive layer (18) and a backing surface (15). The cover sheet includes integral compressible spacer dots (50) so that when finger (13) presses on the touch screen a resistive connection is made between the first and second conductive layers. The touch screen is provided over a display such as en OLED (Organic Light Emitting Diode) flexible flat panel display.

A significant disadvantage with this configuration is a reduction in clarity caused by locating the touch screen component over the display media—the display must be viewed through the touch screen component thus significantly reducing the optical clarity of the display.

WO 2005/010735 describes one solution to this problem, in which the display module is provided on a front face of the housing of handheld electronic equipment and access is provided to the rear surface of the display, on which a touch pad is located. The display is fabricated on a flexible conducting foil substrate which is exposed at the back of the display for detecting capacity of coupling between a user's finger and the substrate. However this arrangement has the significant drawback that the display taint be mounted so that access to the rear of the display, on which is mounted the touch screen component, is provided.

A number of documents describe a type of touch sensitive device in which an LCD screen underlying substrate to provide a touch sensitive display. For examples reference may be made to U.S. Pat. No. 5,623,280, US 2001/0022632, U.S. Pat. No. 5,907,375, and WO 2005/078566 (Which also mentions organic light emitting diode displays). However in these document the displays are not flexible in a conventional same; they are merely sufficiently thin to allow the slight deformation needed for the overall touch sensor functionality. Other background material can be found in US 2003/0026971 and in WO 2004/066136.

SUMMARY OF THE INVENTION

In general a rigid substrate has been thought essential for proper operation of the touch screen, but there is a need for a truly flexible combination device. There has not previously been any description of how such a device might be realised. The inventors have, however, devised a technique for the fabrication of a combined display device and touch sensor which, as a whole, is truly flexible.

According to the present invention there is therefore provided a torch sensitive active matrix display device, the device comprising: a display fabricated on a first flexible substrate, said display having a viewing surface; and a touch sensitive sensor comprising a second flexible substrate, under said display; and wherein said touch sensor is operated by touching said viewing surface of said display; and said combined display and touch sensitive sensor is flexible.

The touch sensitive sensor, which preferably comprises a flexible resistive type sensor, is mounted on the rear of the flexible substrate, that is on a side of the display opposite the viewing surface. However in addition, further touch screen technology may be used such as non-pressure sensitive projected capacitive and inductive type sensors.

In embodiments of the invention, because the touch screen component is positioned below the device structure there is substantially no impairment of the optical clarity of the display. Moreover a user can operate the flexible resistive touch screen display device from the upper, viewing side, therefore making the device easier to use than one in which the rear surface of the display is employed as the touch pad, and enabling a wider range of applications for the device.

In embodiments the touch sensitive sensor and the display both have a layered structure and share the flexible substrate. Thus the sensor may be fabricated on a flexible substrate backplane of the display, or the display backplane, typically comprising an array of thin film transistors, may be fabricated on a flexible substrate a the sensor, or the flexible substrate backplane for the display may be fabricated on a conducting layer of the sensor. In this latter case the conducting layer acts as the flexible substrate, providing physical support for the display backplane.

Typically the resistive touch screen structure comprises first and second conducting layers separated by a spacer arrangement, for example spacer dots composed of beads in an adhesive matrix, dots that are formed by printing or photolithography, or compressible spacer dots integrally formed as part of a flexible layer of the sensor along the lines described in US 2004/212599. However because the sensor is behind the display there is no need for one or both the conducting layers of the sensor to be optically transparent, and in embodiments, a substantially non-transparent conductor may be employed.

As previously mentioned, typically the display includes a backplane comprising an array of transistors, and in preferred embodiments the structure is configured so that the backplane is located on (within or substantially adjacent) a neutral axis or surface (plane) of the device—that is the neutral axis of the device is adjacent or within a layer comprising the array of thin film transistors (TFTs). This reduces the mechanical strain on the transistors during use of the touch sensitive display device. Alternatively the touch sensor may be on (within, or substantially adjacent) the neutral axis or surface.

In some preferred embodiments the display device comprises any flat panel display medium including a reflective display medium, for example an electrophoretic display medium such as electronic paper, as this facilitates the use of a non-transparent conducting material in the touch screen component. However in other embodiments an emissive display medium, for example an OLED display medium, may be employed, or alternatively, a transmissive display medium, such as a liquid crystal medium may be used.

As previously mentioned, preferably the touch sensitive sensor comprises a mechanical sensor including first and second layers of conductors which are electrically connected together in response to mechanical pressure, in broad terms, a resistive touch screen sensor. In some preferred embodiments the display comprises an active matrix display including a multilayer electronic structure adapted to solution deposition onto a flexible substrate. Typically the display comprises a two-dimensional array of pixels addressed by row and column electrodes. The two resistive conducting layers of the touch sensor may each be provided with electrical connections running the lengths of two opposite edges, the pairs of edges for the two different conducting layers being at right angles to one another. In this way the relative magnitude of current flowing into each edge may be used to determine X and Y coordinates of a contact between the two layers in a conventional manner. For example conventional 4, 5, 8 or 9-wire technology may be employed.

In a further aspect the invention provides a touch sensitive active matrix display device, said device comprising: a display fabricated on a flexible substrate, said display having a viewing surface; and a touch sensitive sensor under said display; and wherein said touch sensor is operated by touching said viewing surface of said display; and said active matrix display includes a multilayer electronic structure adapted to solution deposition.

In embodiments the multilayer electronic structure comprises an active matrix backplane of the display.

According to a preferred embodiment of the present invention the flexible touch sensitive active matrix display device comprises an active matrix of organic field-effect transistors (FETs). An organic FET comprises an active semiconducting layer of a conjugated polymer or a small conjugated molecule. Preferably, the organic FET also comprises an organic gate dielectric layer in the form of either a solution processed polymer dielectric, such as, but not limited to polymethylmethacrylate (PMMA) or polystyrene (PS) or en organic gate dielectric deposited by chemical vapour deposition, such as, but not limited to, parylene. Preferably, the thickness of the organic dielectric layer is selected within the range of 200 nm and 1 μm. If the dielectric layer is thinner than 200 nm, a lower device yield is observed, and the devices are more prone to mechanical damage and shorting caused by the mechanical pressure exerted on the active matrix when operating the touch sensor. If the dielectric is thicker than 1 μm, the gate capacitance is too low to achieve the necessary ON-OFF current ratio needed for operation of the display. Organic field-effect transistors, in particular organic FETs comprising conjugated polymer semiconductors and organic gate dielectrics have excellent mechanical properties, such that in embodiments they do not significantly degrade when the flexible touch sensitive active matrix display device is repeatedly bent during operation. Also, in embodiments the organic FETs do net exhibit degradation in their performance when mechanical pressure is applied with a stylus or another sharp, pointed object to operate the touch screen. In contrast many inorganic FETs such as conventional amorphous or polycrystalline FETS are prone to mechanical damage and formation of microcracks when mechanical stress is applied to the layers during operation and bending of the flexible touch sensitive active matrix display. In contrast, embodiments of the flexible touch sensitive active matrix display device we describe can be bent repeatedly to a radius of curvature of less than 5 cm.

To achieve a desired flexibility of the touch sensitive active matrix display the thickness of any of the substrates used for the touch sensor and for the active matrix display is preferably in the range of 10 μm to 250 μm, more preferably in the range of 20 μm to 200 μm. If the thickness of any of the substrates is thicker than this range, the flexibility of the device is impaired. If any of the substrates in between the viewing surface and the bottom substrate of the touch sensor is thicker than 250 μm the resolution of the touch screen is degraded, since higher mechanical forces are required to transmit the mechanical pressure from the viewing surface of the display to the touch sensor mounted underneath. The thickness of the bottom substrate of the touch sensor can in principle be made thicker than any of the other substrates of the device, without it significantly affecting the operation of the touch screen. However, the thickness of the bottom substrate of the touch sensor may be limited by the overall bending requirements for the device.

Preferably the active matrix array of FETs is located near the neutral axis of the device, and in order to achieve this, the thickness of the bottom substrate should not be significantly larger than the other substrates of the device. Let $d_1$ be the thickness of the flexible substrate between the display medium/active matrix and the viewing surface of the device, $d_2$ the thickness of the flexible substrate on which the active matrix is formed, and $d_3$ and $d_4$ the thickness of an upper and lower flexible substrate of the touch sensor, respectively. In one embodiment of the invention the substrate of the active matrix and the upper flexible substrate of the touch sensor are glued together with a pressure sensitive adhesive. Assuming that the thickness of the various active layers of the active matrix, the display medium and the touch sensor are small compared with that of any of the substrates, then in some embodiments $d_2+d_3+d_4 \approx d_1$.

Alternatively, the neutral axis of the device may be selected to be in the plane of the touch sensor elements. In the ease of a resistive touch sensor large stress due to bending can lead to erroneous signals from the touch sensor since bending can lead to the two sensing electrodes touching in the absence of mechanical input. This can be minimized by placing the touch sensor element in the neutral axis. Thus in some other embodiments $d_4 \approx d_1+d_2+d_3$.

In another aspect the invention provides a touch sensitive display device, said device comprising: a display fabricated on a flexible substrate, said displaying having a viewing surface; and a touch sensitive sensor under said display; and wherein said touch sensor is operated by touching said viewing surface of said display; and said touch sensitive sensor is pixellated.

The skilled person will appreciate that features from the above-described aspects and embodiments of the above-described aspects of the invention may be combined in any permutation.

In a still further aspect the invention provides use of a touch sensitive display device as described above, the use comprising: displaying an image on the display device, and sensing touching of the viewing surface of the display and providing a touch sensing signal.

Accordingly, one embodiment of the present invention provides a device configuration for a resistive touch screen structure which incorporates a flexible display medium in contact with a flexible backplane. The backplane comprises an active matrix array of transistors and is formed on a flexible substrate. The flexible display medium is brought in contact with the flexible backplane either through direct deposition of a display active layer, such as an organic light-emitting diode or liquid-crystal display cell, or through lamination with a display medium, such as, but not limited to, an electrophoretic, electrochromic or electronic paper display medium on flexible countersubstrate. The display comprising the flexible backplane and the flexible display medium is laminated on top of a resistive touch screen sensor, which is operable from the top by applying pressure to the display media. By locating the touch screen sensor behind the flexible display the optical quality of the display is not impaired by the finite optical absorption and reflection of the metallic and dielectric layers of the touch screen sensor. In embodiments no optical design compromise, or optical engineering of the display or the touch screen is necessary to integrate the touchscreen functionality with the display.

Embodiments allow incorporation of a non-transparent conductor material within the resistive touch screen component. Such a material could be a thin metallic layer, which replaces the conventional transparent material, such as ITO, of the conductive layers. The use of ITO or other equally brittle materials is not preferred for incorporation into a flexible display, where such materials could be subject to cracking upon flexing. The main advantages of using ITO in current touch screen technology are the fact that ITO is highly conductive, but also highly transparent and is therefore a useful material to ensure the highest degree of optical clarity possible, for the user. The need for transparent materials is described in the prior art as being particularly important. However, the cost of ITO coatings is significant, and this is expected to increase in the future due to scarce natural resources of the raw materials, in particular indium. In embodiments of the invention there is no need to use a transparent conductor for realizing the touch screen functionality, and any metal suitable for flexible substrate integration, such as a conducting polymer or a low-cost, thin-film vacuum or solution-deposited inorganic metal, such as copper or aluminium can be employed.

In a further embodiment the thickness of the overall touch screen structure of the device configuration may be reduced by eliminating the need for an upper polymer film. In this configuration the upper conductive layer of the touch screen is deposited directly onto the bottom surface of the flexible backplane.

In another embodiment, the backplane is processed directly onto the upper conductive layer of the resistive touch screen component. This device design eliminates the need for a separate substrate to be used for the backplane but instead the transistors are fabricated onto the upper conductive layer of the touch screen component.

BRIEF DESCRIPTION OF THE DRAWINGS

To help understanding of the invention, a specific embodiment thereof will now be described by way of example and with reference to the accompanying drawings, in which.

DETAILED DESCRIPTION OF PREFERRED EMBODIMENTS

Broadly speaking we will describe a flexible display device with an integrated touch sensor, wherein a resistive touch screen component is placed underneath a flexible display without impairing the optical clarity of the display, hence yielding 100% optical clarity. The flexible display incorporates a flexible display medium in contact with a flexible backplane on a flexible substrate that allows for the device to be operable from the top by applying pressure to the display media. The flexible display medium and the display backplane are laminated over the resistive touch screen component.

Figure 2:
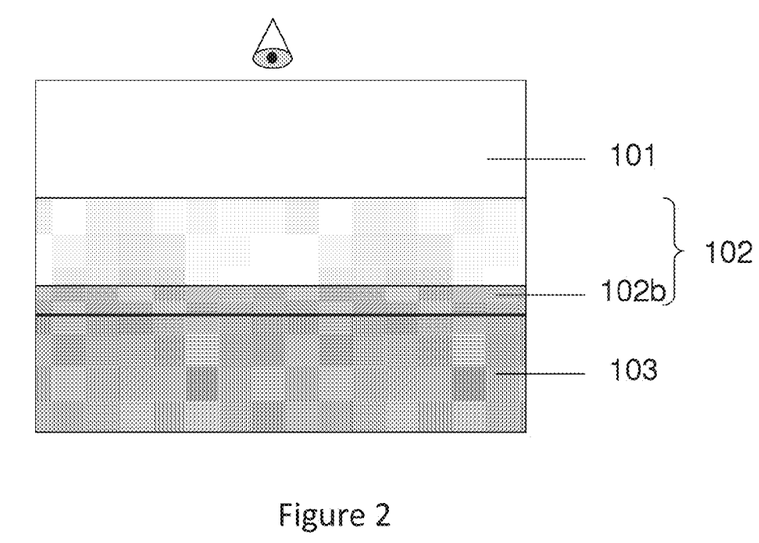
FIG. 2 illustrates a device configuration for a resistive touch screen structure incorporating the touch screen component underneath a flexible display according to an embodiment of the present invention.

Referring to the drawings, FIG. 2 illustrates a device configuration for a resistive touch screen structure which incorporates a display media 101, laminated over a flexible backplane 102. The display media preferably has ultra thin dimensions as described further later. Preferably, an electrophoretic display media is incorporated within the device structure and is located over the backplane. The backplane incorporates a flexible substrate 102b as is shown in FIG. 2. The flexible substrate 102b may be either a thin layer of glass, polymide (PI) or a flexible metallic foil, but preferably the flexible substrate consists of a polymer film, such as polyethyleneterephtalate (PET) or polyethylenenaphtalene (PEN). The display media 101 and display backplane 102 are then laminated over a resistive touch screen 103 by utilising a pressure sensitive adhesive (PSA).

Figure 3:
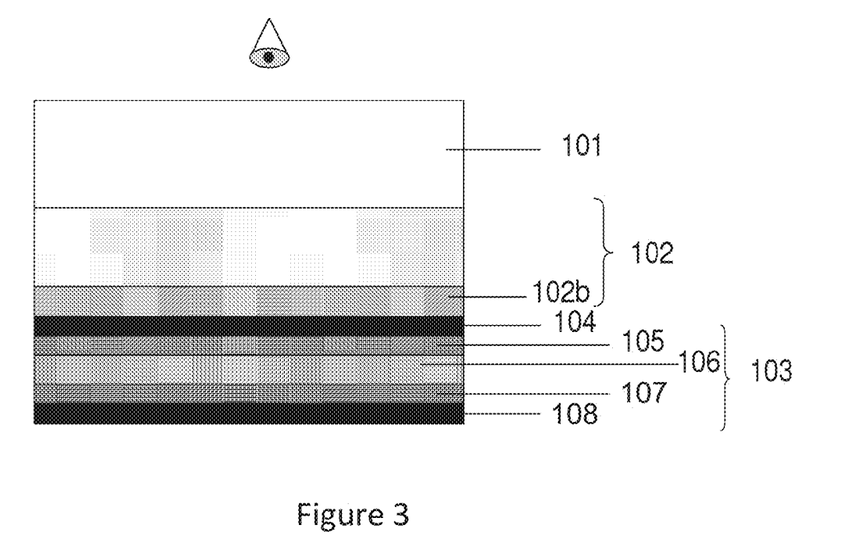
FIG. 3 shows the elements of a resistive touch screen component that is incorporated underneath the resistive touch screen device structure.

Optical clarity is achieved by incorporating a touch screen component onto the backside of the flexible display. FIG. 3 illustrates the elements of a resistive touch screen component 103 that is located on the underneath side of the device. A conducting lower layer 107 is deposited over a bottom substrate 108. The bottom substrate 108 is preferably also is flexible substrate, such as polyethyleneterephtalate (PET) or polyethylenenaphtalene (PEN). Generally, the choice of the bottom substrate 108 is less critical for the operation of the touch screen than of the other substrate below (see discussion below).

A layer of insulating spacer dots 106 is positioned over the lower conductor layer, followed by a further upper layer of conducting material 105, which may be of the same material as the lower layer of conductor material. The spacer dots are positioned in between the conductive layers, in order to separate the said lower and upper conductor layers 105, 107. An upper flexible substrate film 104, such as, but not limited to a plastic substrate, such as PET or PEN, a thin metal foil substrate, such as steel, or a thin glass substrate completes the resistive touch screen component, by forming the upper substrate of the said component. A preferred thickness of the upper substrate material is between 25 μm-50 μm in order to achieve optimum sensitivity of the touchscreen to local pressure applied from the top.

In embodiment of the present invention, the conductive layers 105, 107 of the touch semen can be fabricated from either transparent conductors such as TTO, or non-transparent conductor material, such as a thin metallic layer. In contrast to a device structure where the resistive touch screen is located on top of the display, i.e. in between the user and the display medium, the configuration described here, where the touch screen is hidden from the user behind the display does not require the touch screen to be transparent. Thus, cheap, non-transparent metals such as copper or aluminium can be used for the electrode of the touch screen. Within this novel device configuration, the ability to use a non-transparent conductive material can be used to increase the flexibility of the resistive touch screen device, as thin films of ductile metals are often more flexible than the use of a brittle ceramic such as ITO. In addition, the use of metallic materials for the conductive layers will also have the effect of reducing costs, as thin films of metallic material are generally cheaper materials than ITO. In addition, the effects of the use of metallic layers may also be seen in general performance improvements within the touch screen component, due to the fact that higher conductivity levels may be achieved with metallic materials than with ITO.

To achieve good sensitivity of the touch screen to applied pressure from the top, the upper substrate of the touch semen 104, and the substrate of the flexible backplane 102b, as well as the display medium 101 should be as thin as possible, while maintaining sufficient mechanical integrity and rigidity during manufacture as well as operation. Preferably the thickness of these substrates is on the order of 10-250 μm, more preferably on the order of 20-200 μm. A particularly preferred thickness is approximately 175 μm.

The prevent configuration of the resistive touch screen device allows for the alteration of the thicknesses of the various layers of the whole device stack, in particular the thicknesses of the substrates 108, 104, 102b, and of the display medium and its support in order to ensure that the backplane of the display, comprising an array of thin-film transistors of the device is located in the neutral axis of the device. By locating the transistors within this neutral axis, this ensures that a minimum stress is applied to the backplane upon flexing the resistive touch screen device. Alternatively, the neutral axis of the device can be designed to lie within another layer of the structure which is most prone to mechanical damage, fracture or delamination during flexing.

Figure 4:
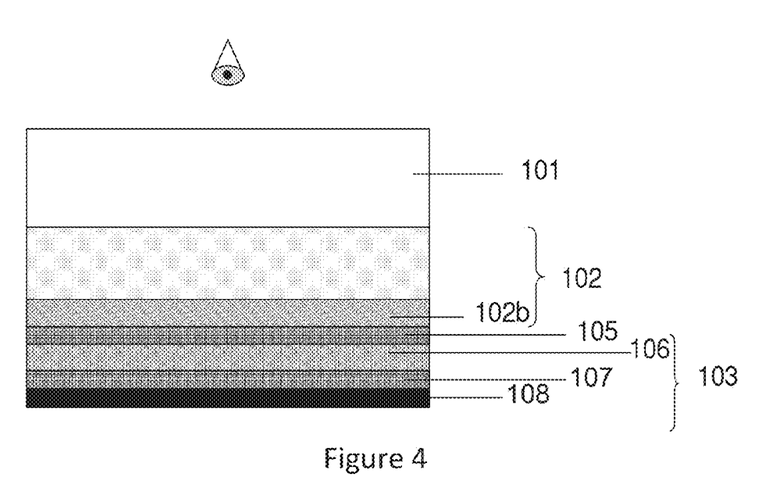
FIG. 4 shows the elements of a resistive touch screen component that is incorporated underneath a flexible display wherein the upper electrode of the touch screen sensor is deposited onto the back of the substrate of the flexible display according to the present invention.

In embodiments of the present invention, the thickness of the overall touch screen structure of the novel device configuration may be reduced by eliminating the need for an upper substrate 104 of the touch screen. In this configuration the upper conductive layer 105 of the resistive touch screen is deposited onto the bottom surface of the flexible backplane 102b (see FIG. 4). This can be achieved by patterning a set of conducting electrodes and interconnects onto the bottom of substrate 102b as part of the manufacturing steps for the flexible backplane, and then subsequently, laminating the flexible backplane with the bottom substrate 108 of the touch screen using similar lamination processes as currently used for bringing in contact the upper and lower substrates 108, and 104 of a conventional touch screen. Alternatively, it is possible to fabricate the flexible backplane directly on top of the upper substrate 104 of the touch screen, by using a completed touch screen laminate as the substrate in the manufacturing process of the active matrix transistor array.

Figure 5:
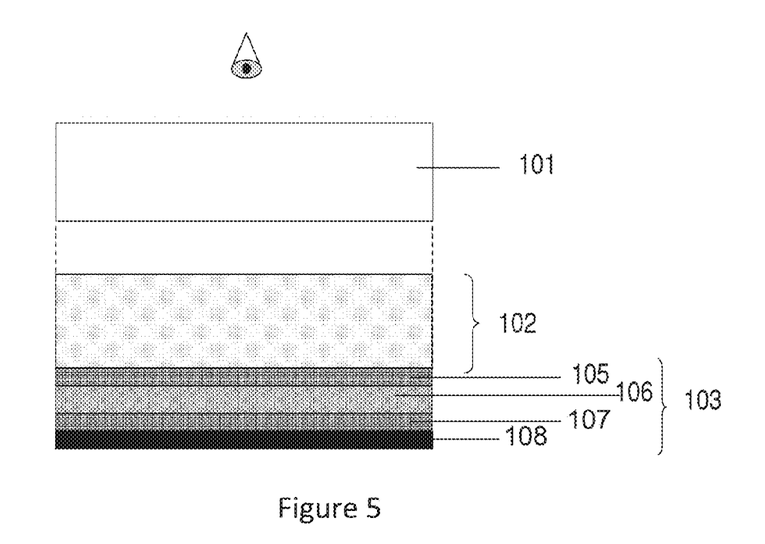
FIG. 5 shows the elements of a resistive touch screen component that is incorporated underneath a flexible display the flexible display backplane is processed directly onto the touch screen component.

To further reduce the overall thickness of the device, the flexible backplane 102 comprising the transistors of the device, may be processed directly onto the upper conductive layer of the resistive touch screen component, as is shown in FIG. 5. To provide electrical insulation a thin dielectric isolation layer 109 is deposited in between the upper conductive layer 105 of the touch screen, and the electroactive layers of the flexible backplane. This isolation layer has a thickness of preferably on the order of 1-20 μm. It can also be used to provide planarization of the surface of the touch screen. In this way the need for a separate substrate to support the backplane is eliminated resulting in a further improvement of the sensitivity of the touch screen to pressure applied through the display element.

In a preferred embodiment of the present invention, a backplane 102 of the resistive touch screen display device is formed on the top side of the resistive touch screen component 103. The complete display is fabricated using an active matrix driving arrangement.

Figure 6:
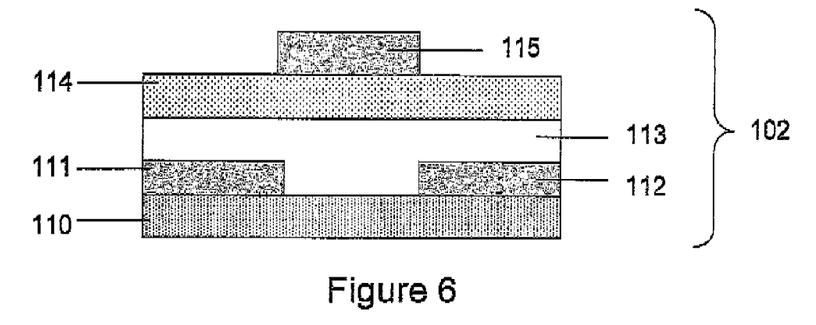
FIG. 6 illustrates a thin film transistor and a flexible substrate; and cross-sectional and plan views respectively of an active matrix display device suitable for solution deposition.

The said backplane comprises an array of transistors. An example transistor is shown in FIG. 6. In some preferred embodiments of the present invention each transistor that forms an array of transistors incorporated onto the backplane may be produced by the following method: conductive material is deposited and patterned on a substrate 110 to form source and drain electrodes 111, 112. Preferably, a flexible substrate may be used that is composed of either glass or a polymer film, but preferably a plastic substrate 102b such as polyethyleneterephtalate (PET) or polyethylenenaphtalene (PEN) is used. The patterned conductive layer 111, 112 comprises a conducting polymer, such as PEDOT, or a metallic material, such as gold or silver. It may be deposited and patterned through solution processing techniques such as, but not limited to, spin, dip, blade, bar, slot-die, or spray coating, inkjet, gravure, offset or screen printing. Alternatively, vacuum deposition techniques may be used, such as evaporation and sputtering as well as photography techniques.

Once the conductive layer has been patterned to form the source and drain electrodes, a layer of semiconducting material 113 may then be deposited over the substrate and patterned electrodes. The semiconducting layer may comprise a vacuum or solution processible organic or inorganics semiconducting material, such as, but not limited to semiconducting polymers, such as polyarylamine, polyfluorene or polythiophene derivatives, a small molecule organic semiconductor, such as pantacene, or a solution-processible inorganic material, such as CdSe, ZnO, or silicon based-nanowires. A broad range of printing techniques may be used to deposit the semiconducting material including, but not limited to, inkjet printing, soft lithographic printing (J. A. Rogers et al., Appl. Phys. Lett. 75, 1010 (1999); S. Brittain et al., Physics World May 1998, p. 31), screen printing (Z. Bao, et al., Chem. Mat. 9, 12999 (1997)), offset printing, blade coating or dip coating, curtain coating, meniscus coating, spray coating, or extrusion coating. Alternatively, the semiconducting layer may be deposited as a thin continuous film and patterned subtractively by techniques snout sa photolithography (see WO 99/10939) or laser ablation.

A layer of gate dielectric material 114 is then deposited onto the layered substrate. Materials such as polyisobutylene or polyvinylphenol may be used as the dielectric material, but preferably polymethylmethacrylate (PMMA) and polystyrene are used. The dielectric material may be deposited in the form of a continuous layer, by techniques such as, but not limited to, spray or blade coating. However, preferably, the technique of spray coating is used.

The deposition of the dielectric layer is then followed by the deposition of a gate electrode 115 and interconnect lines. The material of the gate electrode may be a thin film of inorganic metal such as gold or a cheaper metal such as copper or Aluminium. The gate electrode is deposited using techniques such as sputtering or evaporation techniques or solution processing techniques such as spin, dip, blade, bar, slot-die, gravure, offset or screen printing. Alternatively, electroless deposition techniques or laser ablation may be used.

The transistors are fabricated in the form of an active matrix array with data, gate addressing as well as common electrodes. Each pixel of the array may contain one or more transistors. At least one of the electrodes of the transistors is coupled to an electroactive display element, such as, but not limited to an electrophoretic, electrochromic, or electronic paper display pixel, a liquid crystal display pixel, or an organic light-emitting diode to control the state of the display element by applying either a voltage or current to the display element. The display medium is preferably a reflective display medium in order to facilitate use of non-transparent metals for the touch screen component. However, the display medium can also be a transmissive medium in which case the touch screen is fabricated from transparent conductors, such as ITO.

Finally, a display media component 1 is attached to the completed backplane and the underlying resistive touch screen structure. The display medium is either deposited directly onto the flexible backplane substrate. For example, in the case of a top-emitting polymer light-omitting display medium the optically active polymers can be inkjet printed into the pixel locations of the active matrix followed by deposition of a transparent top cathode, and a transparent encapsulation layer. In the ease of an electrophoretic display medium a film of electrophoretic ink deposited onto a top substrate with a transparent conductive electrode is laminated with the flexible backplane.

Figure 7A:
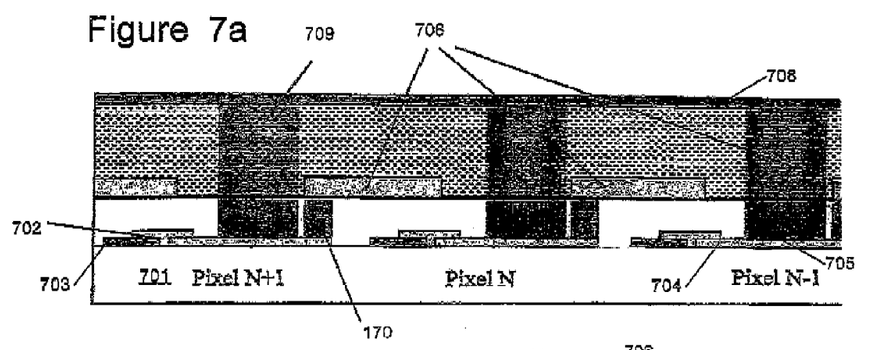
FIGS. 7a-7b illustrate cross-sectional and top views of an active matrix pixel where the display media is voltage controlled.
Figure 7B:
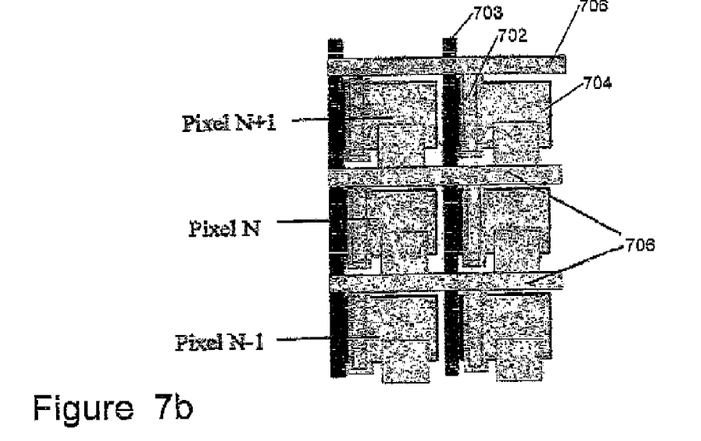

FIGS. 7a and 7b, which are taken from the Applicant's WO 2004/070466, show cross-sectional and top views of an active matrix pixel where the display media is voltage controlled, such as liquid crystal or electronic paper. FIG. 7a shows a side view of a transistor-controlled display device including a pixel capacitor. It has a substrate 701, a semiconductor 702, which may be a continuous layer or may be patterned, (in the figure the semiconductor is patterned to cover the transistor channel), a data line 703, a pixel electrode 704, a transistor dielectric 705, a gate electrode/gate interconnect 706 and a display media 707 (for example liquid crystal or electronic paper and a counter electrode 708 of the display media. In this example the state of the display media is determined by the electric field across the media, and a switchable area 709 of the device can be switched by a voltage difference between the pixel 704 and the top electrode 708.

Although WO 2004/070466 describes fabrication of the display on a rigid substrate using solution deposition techniques (such as inkjet printing, screen printing and offset printing), as described above a similar display can be fabricated on a flexible substrate such as a plastic substrate, also using solution deposition techniques. Some further preferred aspects of solution deposition techniques for deposition onto a flexible substrate are described in the applicant's co-pending UK patent applications nos. 0570173.8, 0506613.9, and 0511117.4, among others, the contents of which are hereby incorporated by reference.

When the flexible display is brought in contact with the touch screen the two components should be registered with respect to each other in order to ensure that applying pressure to a defined area of the display device, activates the correct region of the touch screen. This can be achieved by optical alignment prior to lamination of the two components. In the case of a fabrication process, where at least one of the layers of the flexible backplane and of the touch screen are deposited onto the same substrate the layers of the touch screen and of the flexible backplane can be aligned with respect to each other during the patterning of these layers.

The present invention is not limited to the foregoing examples. For example, although the use of a resistive touch sensor has been described other touch sensitive technology such as that mentioned in the introduction, may also be employed.

Aspects of the present invention include all novel and/or inventive aspects of the concepts described herein and all novel and/or inventive combinations of the features described herein. The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. Aspects of the present invention may comprise any such individual feature or combination of features. In view of the foregoing description it will be evident to a person skilled in the art that various modifications may be made within the scope of the invention.

What is claimed is:

1. A touch sensitive active matrix display device, the device comprising:
   a display having a viewing surface; and
   a capacitive touch sensitive sensor integrated with and under said display, said touch sensitive sensor comprising a flexible substrate, and at least one conductive layer on said flexible substrate; and
   wherein said capacitive touch sensitive sensor is operable by touching said viewing surface of said display;
   wherein said display comprises an electronic paper display medium and has a backplane comprising an active matrix, said active matrix having an array of field-effect transistors comprising an organic semiconductor, said transistors configured to control said display;
   wherein said backplane is disposed on said at least one conductive layer with a dielectric isolation layer between said at least one conductive layer and electroactive layers of said backplane, with said dielectric isolation layer providing electrical insulation between said at least one conductive layer and said electroactive layers of said backplane; and
   wherein said display and capacitive touch sensitive sensor in combination have a flexibility greater than needed for functionality of operation of said capacitive touch sensitive sensor such that said display and capacitive touch sensitive sensor in combination is bendable as a whole.

2. A touch sensitive display device as claimed in claim 1 wherein said capacitive touch sensitive sensor includes a layer comprising a substantially non-transparent conductor.

3. A touch sensitive display device as claimed in claim 1 wherein said display includes a backplane comprising an array of thin-film transistors, and wherein said backplane is located substantially on a neutral surface of said device.

4. A touch sensitive display device as claimed in claim 1 wherein said display comprises a pixellated display.

5. A touch sensitive display device as claimed in claim 1 wherein said display includes a multilayer electronic structure adapted to solution deposition.

6. A touch sensitive display device as claimed in claim 5 wherein said multilayer electronic structure comprises said active matrix backplane of said display.

7. A touch sensitive active matrix display device as claimed in claim 1, wherein said organic semiconductor is a solution-processed polymer semiconductor.

8. A touch sensitive active matrix display device as claimed in claim 1, wherein said field-effect transistor comprises an organic gate dielectric.

9. A touch sensitive active matrix display device as claimed in claim 8, wherein said organic gate dielectric is a solution-processed polymer dielectric.

10. A touch sensitive active matrix display device as claimed in claim 8, wherein said organic gate dielectric is deposited by chemical vapour deposition.

11. A touch sensitive active matrix display device as claimed in claim 10, where said organic gate dielectric is parylene.

12. A touch sensitive active matrix display device as claimed in claim 8, wherein said organic gate dielectric has a thickness between 200 nm and 1 □m.

13. A touch sensitive display device as claimed in claim 1 wherein said flexible substrate has a thickness in the range of 10 μm to 250 μm.

14. A touch sensitive display device as claimed in claim 1 wherein said flexible substrate has a thickness in the range 20 μm to 200 μm.

15. A touch sensitive display device as claimed in claim 1 wherein said dielectric isolation layer has a thickness of 1 μm to 20 μm.

16. A touch sensitive display device as claimed in claim 1 wherein said dielectric isolation layer is arranged to provide planarization of the viewing surface of said display.

17. A touch sensitive display device as claimed in claim 1 wherein said backplane is laminated onto said at least one conductive layer with only said dielectric isolation layer between said at least one conductive layer and said electro-active layers of said backplane.

\* \* \* \* \*